United States Patent [19]
Ishikawa et al.

[11] Patent Number: 5,590,407
[45] Date of Patent: Dec. 31, 1996

[54] DRIVE THROUGH WIRELESS ORDER TAKING SYSTEM

[75] Inventors: Hideaki Ishikawa, Yokohama; Atsunao Shinoda, Fujisawa, both of Japan

[73] Assignee: Matsushita Electric Industrial Co., Ltd., Osaka, Japan

[21] Appl. No.: 533,194

[22] Filed: Sep. 25, 1995

[30] Foreign Application Priority Data

Oct. 11, 1994 [JP] Japan .................................. 6-245573
Oct. 11, 1994 [JP] Japan .................................. 6-245574

[51] Int. Cl.$^6$ .................................................. H04B 7/00
[52] U.S. Cl. ...................... 455/66; 455/38.2; 455/54.1; 455/54.2; 455/56.1; 455/228; 340/286.09
[58] Field of Search ................. 455/66, 54.1, 67.1, 455/67.7, 38.2, 227, 228, 53.1, 54.2, 56.1; 340/286.09, 286.01, 941, 928, 933; 379/159, 160, 167, 168, 170

[56] References Cited

U.S. PATENT DOCUMENTS

| 5,101,200 | 3/1992 | Swett | 340/928 |
| 5,220,677 | 6/1993 | Brooks | 455/53.1 |
| 5,253,162 | 10/1993 | Hassett et al. | 340/928 |
| 5,289,183 | 2/1994 | Hassett et al. | 340/928 |
| 5,321,848 | 6/1994 | Miyahira et al. | 455/66 |

*Primary Examiner*—Reinhard J. Eizenzopf
*Assistant Examiner*—Gertrude Arthur
*Attorney, Agent, or Firm*—Pollock, Vande Sande & Priddy

[57] ABSTRACT

A drive through wireless order taking system includes a base station, and a slave station being connectable with the base station by radio and being movable into and out of a talk lock state. The base station includes a device for transmitting a talk lock release signal to the slave station. The slave station includes a device for moving the slave station out of the talk lock state in response to the talk lock release signal transmitted from the base station.

5 Claims, 8 Drawing Sheets

DRIVE THROUGH WIRELESS ORDER TAKING SYSTEM

BACKGROUND OF THE INVENTION

This invention relates to a drive through wireless order taking system.

Some fast food restaurants have a drive through lane or lanes for taking orders from customers remaining in vehicles. It is well-known to implement wireless communication between the customers and order takers. As will be described later, prior-art wireless order taking systems have problems.

SUMMARY OF THE INVENTION

It is an object of this invention to provide an improved drive through wireless order taking system.

A first aspect of this invention provides a drive through wireless order taking system comprising a base station; and a slave station being connectable with the base station by radio and being movable into and out of a talk lock state; wherein the base station comprises means for transmitting a talk lock release signal to the slave station, and the slave station comprises means for moving the slave station out of the talk lock state in response to the talk lock release signal transmitted from the base station.

A second aspect of this invention is based on the first aspect thereof, and provides a drive through wireless order taking system wherein the base station includes means for detecting that a vehicle moves from a given place in a drive through lane, and said transmitting means comprises means for transmitting the talk lock release signal when said detecting means detects that a vehicle moves from the given place in the drive through lane.

A third aspect of this invention is based on the first aspect thereof, and provides a drive through wireless order taking system further comprising a talk lock release switch, wherein said transmitting means comprises means for transmitting the talk lock release signal when the talk lock release switch is actuated.

A fourth aspect of this invention provides a wireless order taking system for first and second drive through lanes which comprises a first base station in the first drive through lane; a first slave station in the first drive through lane, the first slave station being connectable with the first base station by radio; a second base station in the second drive through lane; a second slave station in the second drive through lane, the second slave station being connectable with the second base station by radio; a wire connected between the first base station and the second base station; first means in the first base station for transmitting a first page communication signal to the second base station via the wire; second means in the second base station for transmitting a second page communication signal to the first base station via the wire; third means in the first base station for receiving the second page communication signal from the second base station, and transmitting the second page communication signal to the first slave station by radio; fourth means in the second base station for receiving the first page communication signal from the first base station, and transmitting the first page communication signal to the second slave station by radio; fifth means in the first base station for detecting that a vehicle comes to a given place in the first drive through lane; sixth means in the first base station for muting the second page communication signal when the fifth means detects that a vehicle comes to the given place in the first drive through lane; seventh means in the second base station for detecting that a vehicle comes to a given place in the second drive through lane; and eighth means in the second base station for muting the first page communication signal when the seventh means detects that a vehicle comes to the given place in the second drive through lane.

A fifth aspect of this invention is based on the fourth aspect thereof, and provides a wireless order taking system wherein the first means comprises means for adding a signal of customer speech and a signal of a beep tone to the first page communication signal when the fifth means detects that a vehicle comes to the given place in the first drive through lane, and the second means comprises means for adding a signal of customer speech and a signal of a beep tone to the second page communication signal when the seventh means detects that a vehicle comes to the given place in the second drive through lane.

DESCRIPTION OF THE PREFERRED EMBODIMENTS

Prior-art drive through wireless order taking systems will be described hereinafter for a better understanding of this invention.

Figure 1:
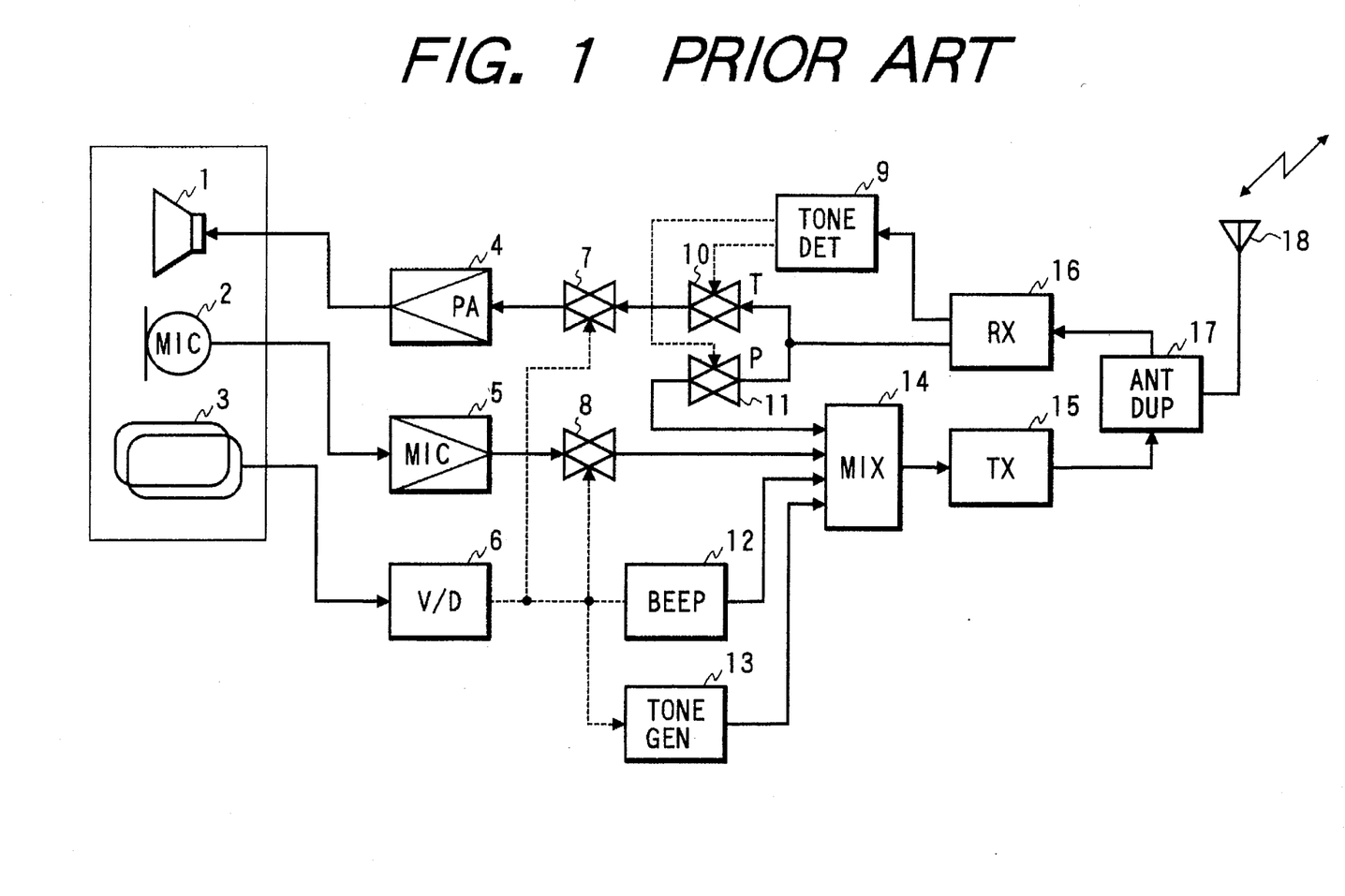
FIG. 1 is a block diagram of a base station in a first prior-art wireless order taking system.
Figure 2:
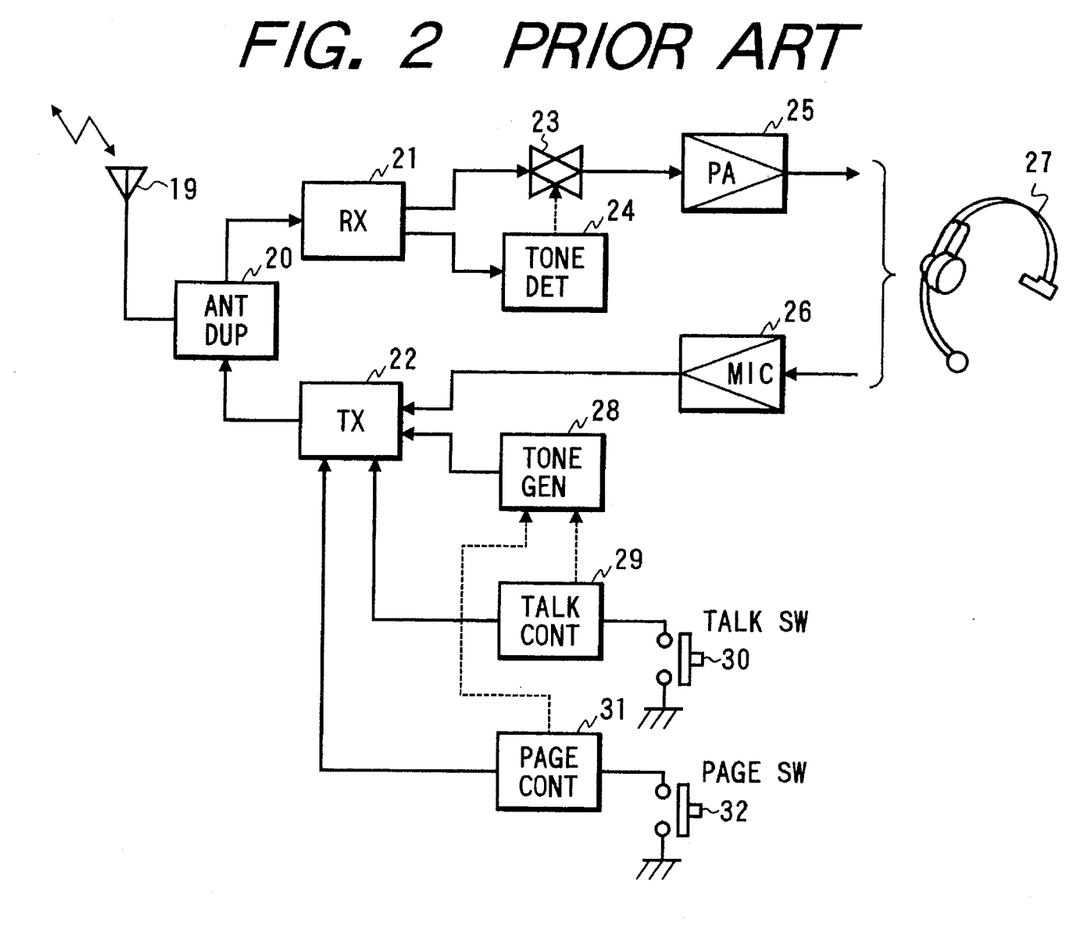
FIG. 2 is a block diagram of a slave station in the first prior-art wireless order taking system.

FIG. 1 and FIG. 2 show a base station and a slave station in a first prior-art wireless order taking system respectively. The prior-art base station of FIG. 1 and the prior-art slave station of FIG. 2 can communicate with each other by wireless (radio).

With reference to FIG. 1, the prior-art base station has a menu board on which a loudspeaker 1, a microphone 2, and a vehicle sensing loop coil 3 are provided. The menu board faces a drive through lane. The loudspeaker 1 is connected to a power amplifier 4 which is successively preceded by analog switches 7 and 10 and a receiver (a radio receiver) 16. The microphone 2 is connected to a microphone amplifier 5 which is successively followed by an analog switch 8, a transmission mixer 14, and a transmitter (a radio transmitter) 15. The loop coil 3 is connected to a vehicle detector 6 which is successively followed by a beep generator 12, the transmission mixer 14, and the transmitter 15.

In the prior-art base station of FIG. 1, a tone detector 9 is connected to the receiver 16, the analog switch 10, and an analog switch 11. The analog switch 11 is also connected to the receiver 16 and the transmission mixer 14. An antenna duplexer 17 is connected to an antenna 18, the receiver 16, and the transmitter 15. A tone generator 13 is connected to the vehicle detector 6 and the transmission mixer 14. The analog switches 7 and 8 are connected to the vehicle detector 6.

With reference to FIG. 2, the prior-art slave station includes a headset 27 attached to an order taker (a slave station operator). The headset 27 has a headphone and a microphone. The headset 27 is connected to a power amplifier 25 and a microphone amplifier 26. The microphone amplifier 26 is followed by a transmitter (a radio transmitter) 22. A tone generator 28 is connected to the transmitter 22, a talk control circuit 29, and a page control circuit 31. A talk switch 30 of a manually-operated type is connected to the talk control circuit 29. The talk switch 30 is actuated when the order taker requires communication with a customer. A page switch 32 of a manually-operated type is connected to the page control circuit 31. The page switch 32 is actuated when the order taker requires communication with a person in another prior-art slave station.

The prior-art slave station of FIG. 2 includes an antenna 19 connected via an antenna duplexer 20 to a receiver (a radio receiver) 21 and the transmitter 22. The receiver 21 is connected to a tone detector 24 and an analog switch 23. The tone detector 24 is also connected to the analog switch 23. The analog switch 23 is connected to the power amplifier 25. The transmitter 22 is also connected to the talk control circuit 29 and the page control circuit 31.

The first prior-art wireless order taking system of FIGS. 1 and 2 operates as follows. When a vehicle comes along the drive through lane to a given place in front of the menu board, the vehicle detector 6 in the prior-art base station of FIG. 1 detects the vehicle in the given place via the loop coil 3. Accordingly, the vehicle detector 6 outputs a corresponding detection signal to the analog switches 7 and 8, turning on the analog switches 7 and 8. The vehicle detector 6 outputs the detection signal also to the beep generator 12 and the tone generator 13, activating the beep generator 12 and the tone generator 13. Speech applied to the menu board microphone 2 from a customer in the vehicle is converted thereby into a corresponding audio speech signal which is fed to the transmission mixer 14 via the microphone amplifier 5 and the analog switch 8. The beep generator 12 outputs an audio beep signal representative of the vehicle detection to the transmission mixer 14. The tone generator 13 outputs an audio guard tone signal to the transmission mixer 14. The audio speech signal, the audio beep signal, and the audio guard tone signal are combined by the transmission mixer 14 into a composite audio signal. The composite audio signal is fed from the transmission mixer 14 to the transmitter 15. The transmitter 15 subjects a first RF carrier to frequency modulation in response to the composite audio signal. The transmitter 15 feeds resultant FM radio wave to the antenna 18 via the antenna duplexer 17. The FM radio wave is radiated from the antenna 18 toward the prior-art slave station of FIG. 2.

The FM radio wave radiated from the antenna 18 of the prior-art base station of FIG. 1 is received by the antenna 19 of the prior-art slave station of FIG. 2. The FM radio wave is fed from the antenna 19 to the receiver 21 via the antenna duplexer 20. The receiver 21 recovers the audio speech signal, the audio beep signal, and the audio guard tone signal from the FM radio wave. The recovered audio guard tone signal is detected by the tone detector 24, and the analog switch 23 is turned on by the tone detector 24 in response to the detection of the audio guard tone signal. The recovered audio beep signal and the recovered audio speech signal are fed from the receiver 21 to the headset 27 via the analog switch 23 and the power amplifier 25 before being converted by the headset 27 into corresponding beep and speech sounds. The beep and speech sounds inform the order taker that the vehicle has come to the given place in the drive through lane. Then, the order taker depresses the talk switch 30 to start communication with the customer in the vehicle. When the talk switch 30 is depressed, the talk control circuit 29 changes the transmitter 22 to a talk lock state and activates the tone generator 28. The transmitter 22 remains in the talk lock state until the talk switch 30 is depressed again (next). Speech applied to the headset 27 from the order taker is converted thereby into a corresponding audio speech signal which is fed to the transmitter 22 via the microphone amplifier 26. The tone generator 28 outputs an audio talk tone signal to the transmitter 22. The transmitter 22 subjects a second RF carrier to frequency modulation in response to the audio speech signal and the audio talk tone signal. The transmitter 22 feeds the resultant FM radio wave to the antenna 19 via the antenna duplexer 20. The FM radio wave is radiated from the antenna 19 toward the prior-art base station of FIG. 1.

The FM radio wave radiated from the antenna 19 of the prior-art slave station of FIG. 2 is received by the antenna 18 of the prior-art base station of FIG. 1. The FM radio wave is fed from the antenna 18 to the receiver 16 via the antenna duplexer 17. The receiver 16 recovers the audio speech signal and the audio talk tone signal from the FM radio wave. The recovered audio talk tone signal is detected by the tone detector 9, and the analog switch 10 is turned on by the tone detector 9 in response to the detection of the audio talk tone signal. The recovered audio speech signal is fed from the receiver 16 to the menu board loudspeaker 1 via the analog switches 7 and 10 and the power amplifier 4 before being converted by the menu board loudspeaker 1 into corresponding speech sounds.

In this way, the customer in the vehicle and the order taker can communicate with each other by radio. Specifically, the customer in the vehicle communicates with the order taker by using the menu board loudspeaker 1 and the menu board microphone 2. When order taking communication is completed, the customer drives the vehicle from the given place so that the vehicle moves away from the menu board. In the prior-art base station of FIG. 1, the loop coil 3 senses the movement of the vehicle away from the menu board, and hence the vehicle detector 6 outputs a corresponding off signal to the analog switches 7 and 8. As a result, the analog switches 7 and 8 are turned off. Thus, the feed of the audio speech signal from the menu board microphone 2 to the transmitter 15 is interrupted, and the feed of the audio speech signal to the menu board loudspeaker 1 is interrupted. The vehicle detector 6 outputs the off signal also to the beep generator 12 and the tone generator 13, deactivating the beep generator 12 and the tone generator 13. As a result, the beep generator 12 and the tone generator 13 stop outputting the audio beep signal and the audio guard tone signal respectively. In the prior-art slave station of FIG. 2, the recovered audio speech signal disappears due to the interruption of the feed of the audio speech signal to the transmitter 15 at the prior-art base station of FIG. 1. Also, in the prior-art slave station of FIG. 2, the recovered audio beep signal and the recovered audio guard tone signal disappear due to the end of the audio beep signal and the audio guard tone signal at the prior-art base station of FIG. 1. Accordingly, the corresponding beep and speech sounds disappear from the headset 27. The order taker is informed by the disappearance of the beep and speech sounds that the vehicle has moved away from the menu board. Thus, the order taker depresses the talk switch 30 again. When the talk switch 30 is depressed again, the talk control circuit 29 changes the transmitter 22 from the talk lock state to a stand-by state.

The order taker depresses the page switch 32 when requiring communication with a person in another prior-art slave station. In response to the depression of the page switch 32, the page control circuit 31 changes the transmitter 22 to a page lock state and activates the tone generator 28. The transmitter 22 remains in the page lock state until the page switch 32 is depressed again (next). Speech applied to the headset 27 from the order taker is converted thereby into a corresponding audio speech signal which is fed to the transmitter 22 via the microphone amplifier 26. The tone generator 28 outputs an audio page tone signal to the transmitter 22. The transmitter 22 subjects the second RF carrier to frequency modulation in response to the audio speech signal and the audio page tone signal. The transmitter 22 feeds the resultant FM radio wave to the antenna 19 via the antenna duplexer 20. The FM radio wave is radiated from the antenna 19 toward the prior-art base station of FIG. 1. The FM radio wave radiated from the antenna 19 of the prior-art slave station of FIG. 2 is received by the antenna 18 of the prior-art base station of FIG. 1. The FM radio wave is fed from the antenna 18 to the receiver 16 via the antenna duplexer 17. The receiver 16 recovers the audio speech signal and the audio page tone signal from the FM radio wave. The recovered audio page tone signal is detected by the tone detector 9, and the analog switch 11 is turned on by the tone detector 9 in response to the detection of the audio page tone signal. The recovered audio speech signal is fed from the receiver 16 to the transmitter 15 via the analog switch 11 and the transmission mixer 14. The transmitter 15 subjects the first RF carrier to frequency modulation in response to the recovered audio speech signal. The transmitter 15 feeds resultant FM radio wave to the antenna 18 via the antenna duplexer 17. The FM radio wave is radiated from the antenna 18 toward another prior-at slave station. In this way, the order taker in the prior-art slave station of FIG. 2 can communicate with a person in another prior-art slave station while the prior-at base station of FIG. 1 serves as a repeater.

In the first prior-art wireless order taking system of FIGS. 1 and 2, the order taker is required to depress the talk switch 30 again to change the transmitter 22 to the stand-by state when being informed that the vehicle has moved away from the menu board. In the case where the order taker fails to depress the talk switch 30 again, the transmitter 22 continues to be in the talk lock state. Thus, in this case, the prior-art slave station of FIG. 2 tends to interfere with communication between the prior-art base station of FIG. 1 and another prior-art slave station. Further, it is difficult to implement page communication between the prior-art slave station of FIG. 2 and another prior-art slave station.

Figure 3:
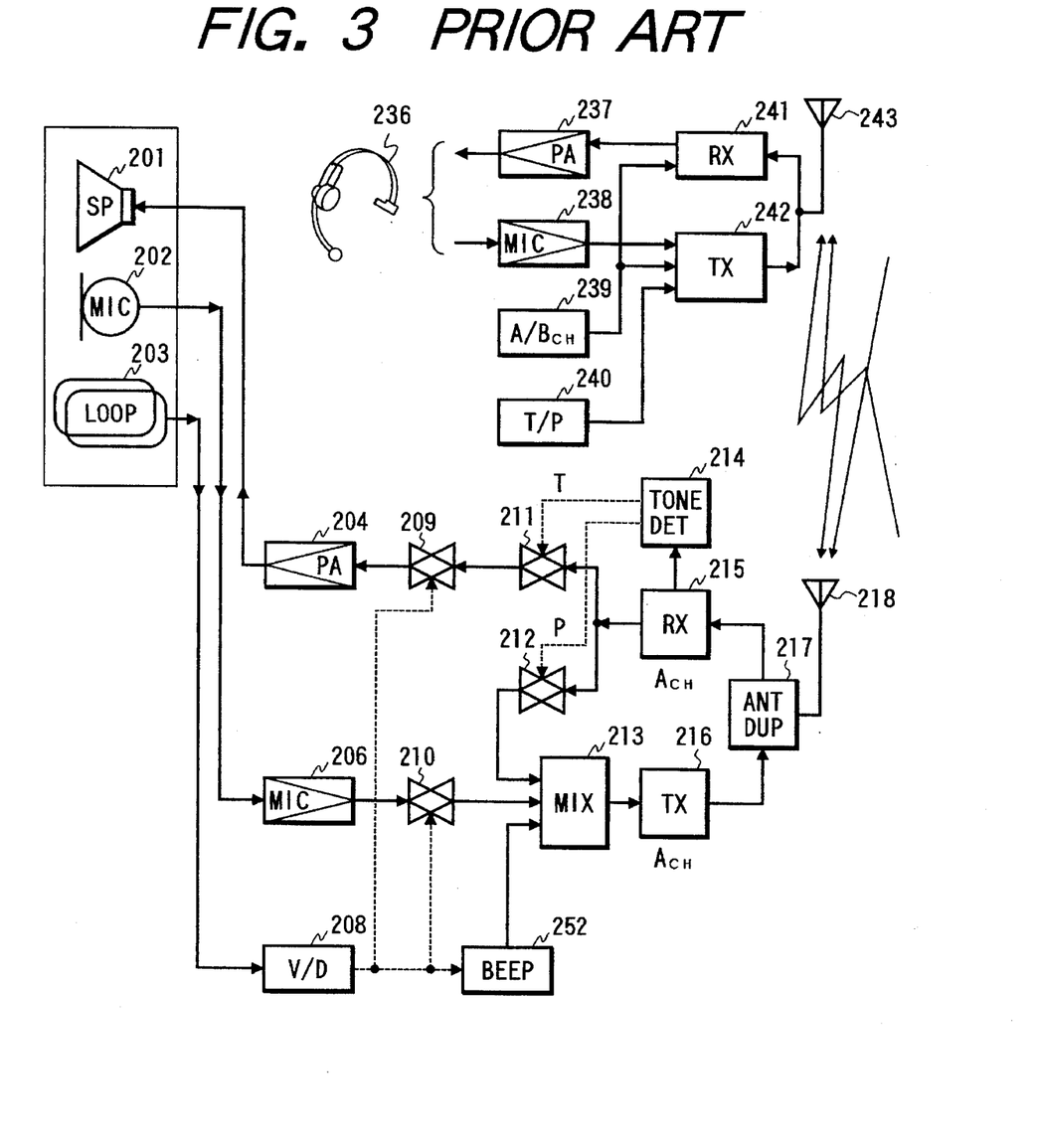
FIG. 3 is a block diagram of a base station and a slave station of a drive through lane "A" in a second prior-art wireless order taking system which is of a double drive through type.
Figure 4:
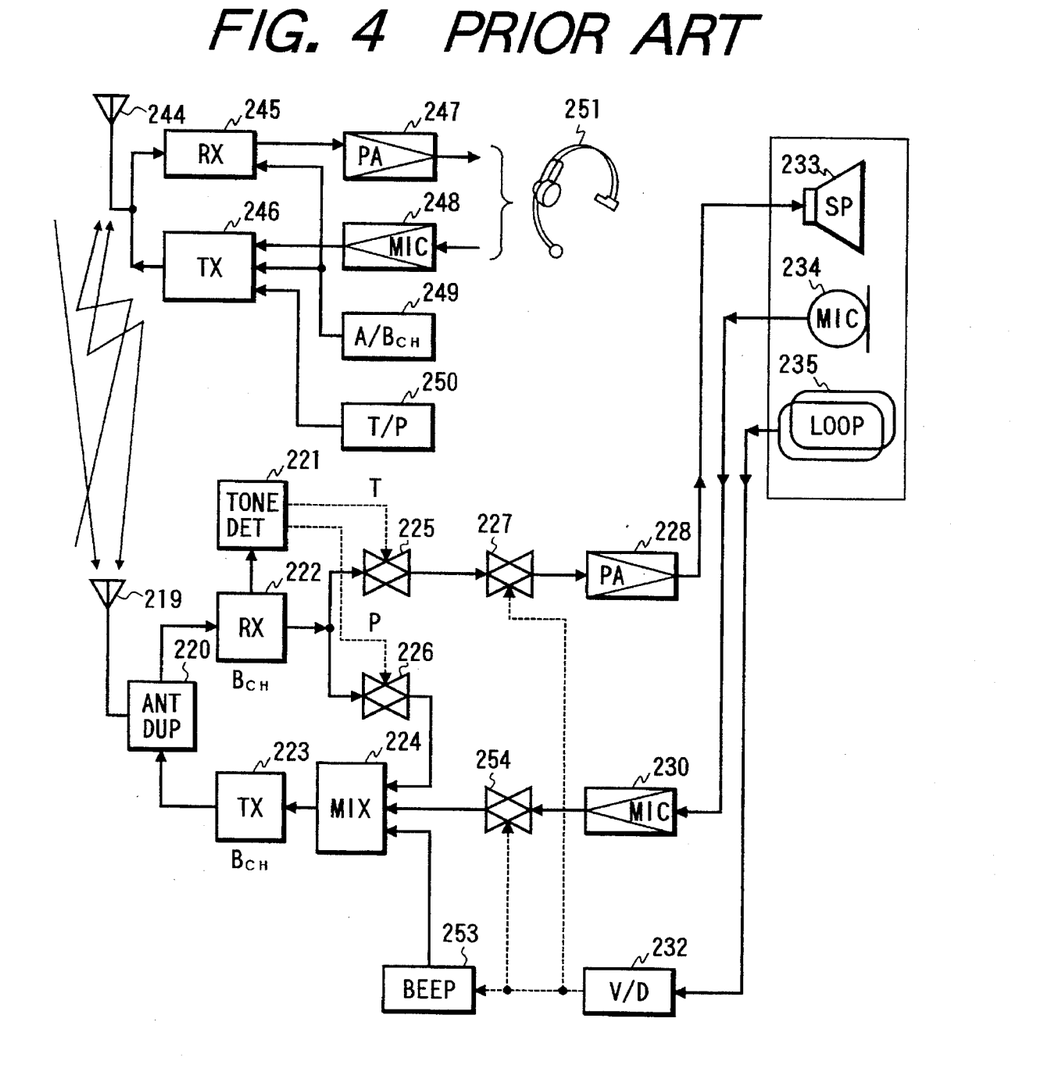
FIG. 4 is a block diagram of a base station and a slave station of a drive through lane "B" in the second prior-art wireless order taking system.

FIG. 3 and FIG. 4 show base stations and slave stations in a second prior-art wireless order taking system which is of a double drive through type. FIG. 3 illustrates a prior-art base station and a prior-art slave station of a drive through lane "A". FIG. 4 illustrates a prior-art base station and a prior-art slave station of a drive through lane "B".

With reference to FIG. 3, the prior-art base station of the drive through lane "A" has a menu board on which a loudspeaker 201, a microphone 202, and a vehicle sensing loop coil 203 are provided. The menu board faces the drive through lane "A". The loudspeaker 201 is connected to a power amplifier 204 which is successively preceded by analog switches 209 and 211 and a receiver (a radio receiver) 215. The microphone 202 is connected to a microphone amplifier 206 which is successively followed by an analog switch 210, a transmission mixer 213, and a transmitter (a radio transmitter) 216. The loop coil 203 is connected to a vehicle detector 208 which is successively followed by a beep generator 252, the transmission mixer 213, and the transmitter 216.

In the prior-art base station of FIG. 3, a tone detector 214 is connected to the receiver 215, the analog switch 211, and an analog switch 212. The analog switch 212 is also connected to the receiver 215 and the transmission mixer 213. An antenna duplexer 217 is connected to an antenna 218, the receiver 215, and the transmitter 216. The analog switches 209 and 210 are connected to the vehicle detector 208.

With reference to FIG. 3, the prior-art slave station of the drive through lane "A" includes a headset 236 attached to an order taker (a slave station operator). The headset 236 has a headphone and a microphone. The headset 236 is connected to a power amplifier 237 and a microphone amplifier 238. The power amplifier 237 is preceded by a receiver (a radio receiver) 241. The microphone amplifier 238 is followed by a transmitter (a radio transmitter) 242. The receiver 241 and the transmitter 242 are connected to an antenna 243. An A/B lane change switch 239 is connected to the receiver 241 and the transmitter 242. A talk/page change switch 240 is connected to the transmitter 242. Here, "talk" means communication between the order taker and a customer in a vehicle while "page" means communication between the order taker and another order taker.

With reference to FIG. 4, the prior-art base station of the drive through lane "B" has a menu board on which a loudspeaker 233, a microphone 234, and a vehicle sensing loop coil 235 are provided. The menu board faces the drive through lane "B". The loudspeaker 233 is connected to a power amplifier 228 which is successively preceded by analog switches 227 and 225 and a receiver (a radio receiver) 222. The microphone 234 is connected to a microphone amplifier 230 which is successively followed by an analog switch 254 a transmission mixer 224, and a transmitter (a radio transmitter) 223. The loop coil 235 is connected to a vehicle detector 232 which is successively followed by a beep generator 253, the transmission mixer 224, and the transmitter 223.

In the prior-art base station of FIG. 4, a tone detector 221 is connected to the receiver 222, the analog switch 225, and an analog switch 226. The analog switch 226 is also connected to the receiver 222 and the transmission mixer 224. An antenna duplexer 220 is connected to an antenna 219, the receiver 222, and the transmitter 223. The analog switches 227 and 254 are connected to the vehicle detector 232.

With reference to FIG. 4, the prior-art slave station of the drive through lane "B" includes a headset 251 attached to an order taker (a slave station operator). The headset 251 has a headphone and a microphone. The headset 251 is connected to a power amplifier 247 and a microphone amplifier 248. The power amplifier 247 is preceded by a receiver (a radio receiver) 245. The microphone amplifier 248 is followed by a transmitter (a radio transmitter) 246. The receiver 245 and the transmitter 246 are connected to an antenna 244. An A/B lane change switch 249 is connected to the receiver 245 and the transmitter 246. A talk/page change switch 250 is connected to the transmitter 246.

The second prior-art wireless order taking system of FIGS. 3 and 4 operates as follows. When a vehicle comes along the drive through lane "A" to a given place in front of the menu board, the vehicle detector 208 in the prior-art A-lane base station of FIG. 3 detects the vehicle in the given place via the loop coil 203. Accordingly, the vehicle detector 208 outputs a corresponding detection signal to the analog switches 209 and 210, turning on the analog switches 209 and 210. The vehicle detector 208 outputs the detection signal also to the beep generator 252, activating the beep generator 252. Speech applied to the menu board microphone 202 from a customer in the vehicle is converted thereby into a corresponding audio speech signal which is fed to the transmission mixer 213 via the microphone amplifier 206 and the analog switch 210. The beep generator 252 outputs an audio beep signal representative of the vehicle detection to the transmission mixer 213. The audio speech signal and the audio beep signal are combined by the transmission mixer 213 into a composite audio signal. The composite audio signal is fed from the transmission mixer 213 to the transmitter 216. The transmitter 216 subjects a first RF carrier to frequency modulation in response to the composite audio signal. The transmitter 216 feeds resultant FM radio wave to the antenna 218 via the antenna duplexer 217. The FM radio wave is radiated from the antenna 218 toward the prior-art A-lane slave station of FIG. 3.

The FM radio wave radiated from the antenna 218 of the prior-art A-lane base station of FIG. 3 is received by the antenna 243 of the prior-art A-lane slave station of FIG. 3. The FM radio wave is fed from the antenna 243 to the receiver 241. The A/B lane change switch 239 is previously set to an A-lane position so that the receiver 241 and the transmitter 242 operate in modes for the drive through lane "A". The receiver 241 recovers the audio speech signal and the audio beep signal from the FM radio wave. The recovered audio beep signal and the recovered audio speech signal are fed from the receiver 241 to the headset 236 via the power amplifier 237 before being converted by the headset 236 into corresponding beep and speech sounds. The beep and speech sounds inform the order taker that the vehicle has come to the given place in the drive through lane "A". Then, the order taker changes the talk/page change switch 240 to a talk position. The operation mode of the transmitter 242 is changed to a talk mode in response to the change of the talk/page change switch 240 to the talk position. Speech applied to the headset 236 from the order taker is converted thereby into a corresponding audio speech signal which is fed to the transmitter 242 via the microphone amplifier 238. The transmitter 242 subjects a second RF carrier to frequency modulation in response to the audio speech signal. The transmitter 242 superimposes an audio talk tone signal on the audio speech signal when operating in the talk mode. The transmitter 242 feeds resultant FM radio wave to the antenna 243. The FM radio wave is radiated from the antenna 243 toward the prior-art A-lane base station of FIG. 3.

The FM radio wave radiated from the antenna 243 of the prior-art A-lane slave station of FIG. 3 is received by the antenna 218 of the prior-art A-lane base station of FIG. 3. The FM radio wave is fed from the antenna 218 to the receiver 215 via the antenna duplexer 217. The receiver 215 recovers the audio speech signal and the audio talk tone signal from the FM radio wave. The recovered audio talk tone signal is detected by the tone detector 214, and the analog switch 211 is turned on by the tone detector 214 in response to the detection of the audio talk tone signal. The recovered audio speech signal is fed from the receiver 215 to the menu board loudspeaker 201 via the analog switches 211 and 209 and the power amplifier 204 before being converted by the menu board loudspeaker 201 into corresponding speech sounds. In this way, the customer in the vehicle and the order taker can communicate with each other by wireless (radio).

In the case where a vehicle is absent from the given place in the drive through lane "A", the order taker sets the talk/page change switch 240 to a page position when requiring wireless communication with a person in another prior-art A-lane slave station via the prior-art A-lane base station of FIG. 3. The operation mode of the transmitter 242 is changed to a page mode in response to the setting of the talk/page change switch 240 to the page position. Speech applied to the headset 236 from the order taker is converted thereby into a corresponding audio speech signal which is fed to the transmitter 242 via the microphone amplifier 238. The transmitter 242 subjects the second RF carrier to frequency modulation in response to the audio speech signal. The transmitter 242 superimposes am audio page tone signal on the audio speech signal when operating in the page mode. The transmitter 242 feeds resultant FM radio wave to the antenna 243. The FM radio wave is radiated from the antenna 243 toward the prior-art A-lane base station of FIG. 3.

The FM radio wave radiated from the antenna 243 of the prior-art A-lane slave station of FIG. 3 is received by the antenna 218 of the prior-art A-lane base station of FIG. 3. The FM radio wave is fed from the antenna 218 to the receiver 215 via the antenna duplexer 217. The receiver 215 recovers the audio speech signal and the audio page tone signal from the FM radio wave. The recovered audio page tone signal is detected by the tone detector 214, and the analog switch 212 is turned on by the tone detector 214 in response to the detection of the audio page tone signal. The recovered audio speech signal is fed from the receiver 215 to the transmitter 216 via the analog switch 212 and the transmission mixer 213. The transmitter 216 subjects the first RF carrier to frequency modulation in response to the recovered audio speech signal. The transmitter 216 feeds resultant FM radio wave to the antenna 218 via the antenna duplexer 217. The FM radio wave is radiated from the antenna 218 toward another prior-art A-lane slave station. In this way, the order taker in the prior-art A-lane slave station of FIG. 3 can communicate with a person in another prior-art A-lane slave station while the prior-art A-lane base station of FIG. 3 serves as a repeater.

Operation of the prior-art B-lane base station and the prior-art B-lane slave station of FIG. 4 is similar to the previously-mentioned operation of the prior-art A-lane base station and the prior-art A-lane slave station of FIG. 3.

In the second prior-art wireless order taking system of FIGS. 3 and 4, order taking communication related to the drive through lane "A" and order taking communication related to the drive through lane "B" can be simultaneously executed independent of each other.

In the second prior-art wireless order taking system of FIGS. 3 and 4, different order takers are generally required to continuously monitor vehicle detecting conditions of the drive through lanes "A" and "B" via the headsets 236 and 251 respectively. In general, it is difficult to implement page communication between the prior-art slave stations of the different drive through lanes respectively.

First Embodiment

Figure 5:
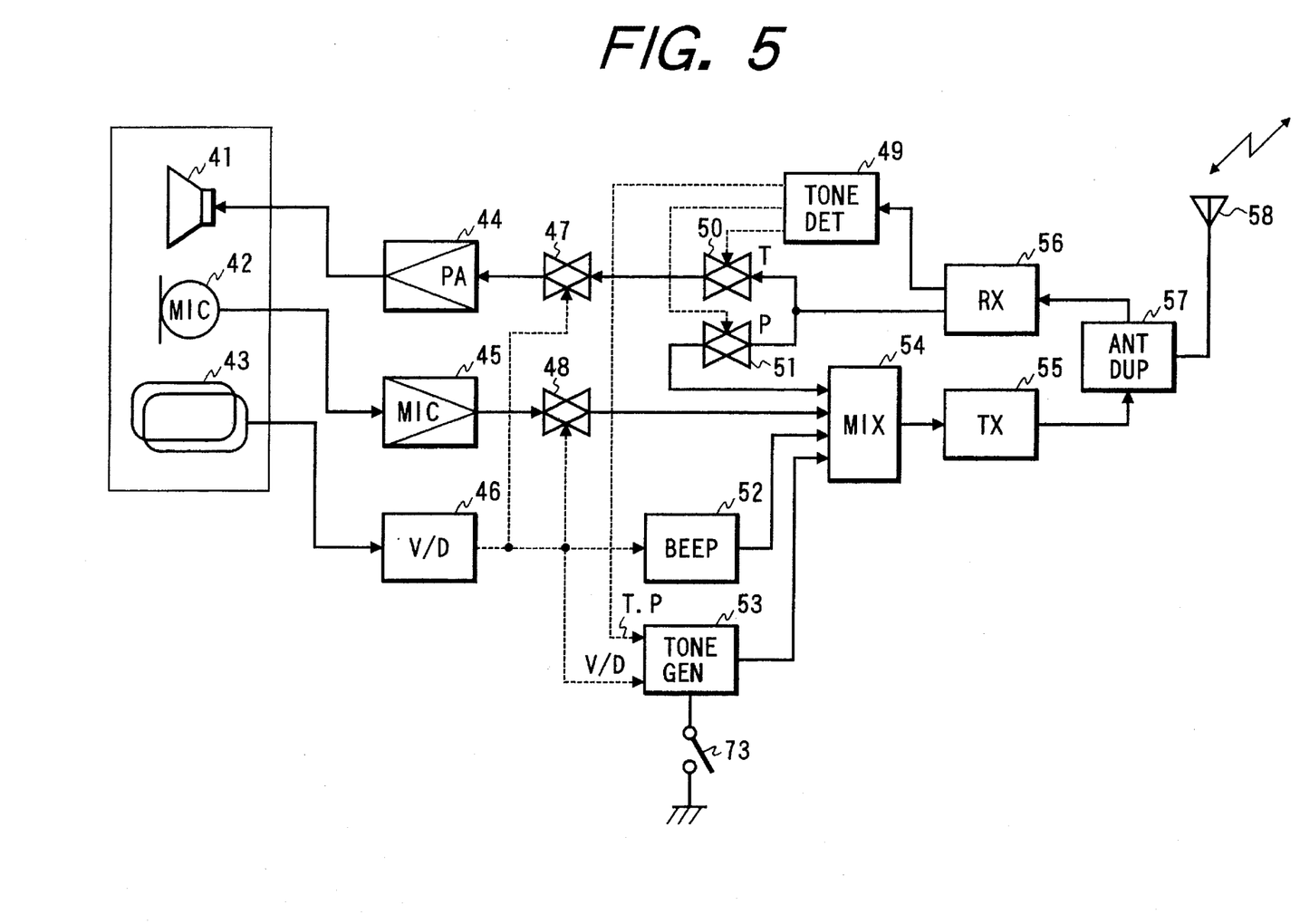
FIG. 5 is a block diagram of a base station in a wireless order taking system according to a first embodiment of this invention.
Figure 6:
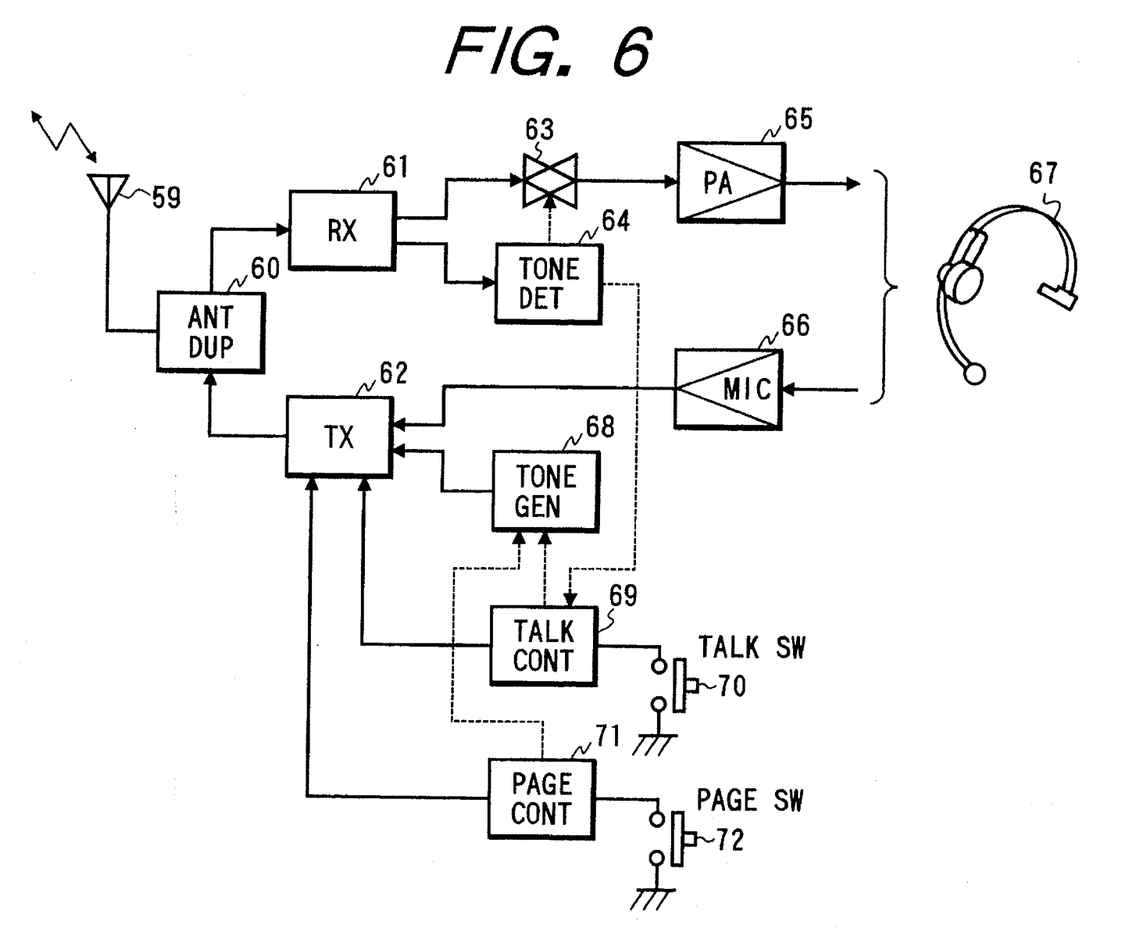
FIG. 6 is a block diagram of a slave station in the wireless order taking system according to the first embodiment of this invention.

FIG. 5 and FIG. 6 show a base station and a slave station in a wireless order taking system according to a first embodiment of this invention. Specifically, FIG. 5 illustrates the base station while FIG. 6 illustrates the slave station. The base station of FIG. 5 and the slave station of FIG. 6 can communicate with each other by wireless (radio).

With reference to FIG. 5, the base station has a menu board on which a loudspeaker 41, a microphone 42, and a vehicle sensing loop coil 43 are provided. The menu board faces a drive through lane. The loudspeaker 41 is connected to a power amplifier 44 which is successively preceded by analog switches 47 and 50 and a receiver (a radio receiver) 56. The microphone 42 is connected to a microphone amplifier 45 which is successively followed by an analog switch 48, a transmission mixer 54, and a transmitter (a radio transmitter) 55. The loop coil 43 is connected to a vehicle detector 46 which is successively followed by a beep generator 52, the transmission mixer 54, and the transmitter 55.

In the base station of FIG. 5, a tone detector 49 is connected to the receiver 56, the analog switch 50, and an analog switch 51. The analog switch 51 is also connected to the receiver 56 and the transmission mixer 54. An antenna duplexer 57 is connected to an antenna 58, the receiver 56, and the transmitter 55. A tone generator 53 is connected to the vehicle detector 46 and the transmission mixer 54. The tone generator 53 is also connected to the tone detector 49. The tone generator 53 is designed to output an additional audio signal which represents a talk lock release tone. A talk lock canceling switch 73 of a manually-operated type is connected to the tone generator 53. The analog switches 47 and 48 are connected to the vehicle detector 46.

With reference to FIG. 6, the slave station includes a headset 67 attached to an order taker (a slave station operator). The headset 67 has a headphone and a microphone. The headset 67 is connected to a power amplifier 65 and a microphone amplifier 66. The microphone amplifier 66 is followed by a transmitter (a radio transmitter) 62. A tone generator 68 is connected to the transmitter 62, a talk control circuit 69, and a page control circuit 71. A talk switch 70 of a manually-operated type is connected to the talk control circuit 69. The talk switch 70 is actuated when the order taker requires communication with a customer in a vehicle. A page switch 72 of a manually-operated type is connected to the page control circuit 71. The page switch 72 is actuated when the order taker requires communication with a person in another slave station.

The slave station of FIG. 6 includes an antenna 59 connected via an antenna duplexer 60 to a receiver (a radio receiver) 61 and the transmitter 62. The receiver 61 is connected to a tone detector 64 and an analog switch 63. The tone detector 64 is also connected to the analog switch 63 and the talk control circuit 69. The tone detector 64 is designed to also detect the audio signal representing the talk lock release tone. The analog switch 63 is connected to the power amplifier 65. The transmitter 62 is also connected to the talk control circuit 69 and the page control circuit 71.

The wireless order taking system of FIGS. 5 and 6 operates as follows. When a vehicle comes along the drive through lane to a given place in front of the menu board, the vehicle detector 46 in the base station of FIG. 5 detects the vehicle in the given place via the loop coil 43. Accordingly, the vehicle detector 46 outputs a corresponding detection signal to the analog switches 47 and 48, turning on the analog switches 47 and 48. The vehicle detector 46 outputs the detection signal also to the beep generator 52 and the tone generator 53, activating the beep generator 52 and the tone generator 53. Speech applied to the menu board microphone 42 from a customer in the vehicle is converted thereby into a corresponding audio speech signal which is fed to the transmission mixer 54 via the microphone amplifier 45 and the analog switch 48. The beep generator 52 outputs an audio beep signal representative of the vehicle detection to the transmission mixer 54. The tone generator 53 outputs an audio guard tone signal to the transmission mixer 54. The audio speech signal, the audio beep signal, and the audio guard tone signal are combined by the transmission mixer 54 into a composite audio signal. The composite audio signal is fed from the transmission mixer 54 to the transmitter 55. The transmitter 55 subjects a first RF carrier to frequency modulation in response to the composite audio signal. The transmitter 55 feeds resultant FM radio wave to the antenna 58 via the antenna duplexer 57. The FM radio wave is radiated from the antenna 58 toward the slave station of FIG. 6.

The FM radio wave radiated from the antenna 58 of the base station of FIG. 5 is received by the antenna 59 of the slave station of FIG. 6. The received FM radio wave is fed from the antenna 59 to the receiver 61 via the antenna duplexer 60. The receiver 61 recovers the audio speech signal, the audio beep signal, and the audio guard tone signal from the FM radio wave. The recovered audio guard tone signal is detected by the tone detector 64, and the analog switch 63 is turned on by the tone detector 64 in response to the detection of the audio guard tone signal. The recovered audio beep signal and the recovered audio speech signal are fed from the receiver 61 to the headset 67 via the analog switch 63 and the power amplifier 65 before being converted by the headset 67 into corresponding beep and speech sounds. The beep and speech sounds inform the order taker that the vehicle has come to the given place in the drive through lane. Then, the order taker depresses the talk switch 70 to start communication with the customer in the vehicle. When the talk switch 70 is depressed, the talk control circuit 69 changes the transmitter 22 to a talk lock state and activates the tone generator 68. Normally, the transmitter 62 can remain in the talk lock state until the talk switch 70 is depressed again (next). Speech applied to the headset 67 from the order taker is converted thereby into a corresponding audio speech signal which is fed to the transmitter 62 via the microphone amplifier 66. The tone generator 68 outputs an audio talk tone signal to the transmitter 62. The transmitter 62 subjects a second RF carrier to frequency modulation in response to the audio speech signal and the audio talk tone signal. The transmitter 62 feeds resultant FM radio wave to the antenna 59 via the antenna duplexer 60. The FM radio wave is radiated from the antenna 59 toward the base station of FIG. 5.

The FM radio wave radiated from the antenna 59 of the slave station of FIG. 6 is received by the antenna 58 of the base station of FIG. 5. The FM radio wave is fed from the antenna 58 to the receiver 56 via the antenna duplexer 57. The receiver 56 recovers the audio speech signal and the audio talk tone signal from the FM radio wave. The recovered audio talk tone signal is detected by the tone detector 49, and the analog switch 50 is turned on by the tone detector 49 in response to the detection of the audio talk tone signal. The recovered audio speech signal is fed from the receiver 56 to the menu board loudspeaker 41 via the analog switches 47 and 50 and the power amplifier 44 before being converted by the menu board loudspeaker 41 into corresponding speech sounds.

In this way, the customer in the vehicle and the order taker can communicate with each other by wireless (radio). Specifically, the customer in the vehicle communicates with the order taker by using the menu board loudspeaker 41 and the menu board microphone 42. When order taking communication is completed, the customer drives the vehicle from the given place so that the vehicle moves away from the menu board. In the base station of FIG. 5, the loop coil 43 senses the movement of the vehicle away from the menu board, and hence the vehicle detector 46 outputs a corresponding off signal to the analog switches 47 and 48. As a result, the analog switches 47 and 48 are turned off. Thus, the feed of the audio speech signal from the menu board microphone 42 to the transmitter 55 is interrupted, and the feed of the audio speech signal to the menu board loudspeaker 41 is interrupted. The vehicle detector 46 outputs the off signal also to the beep generator 52 and the tone generator 53, deactivating the beep generator 52 and the tone generator 53. As a result, the beep generator 52 and the tone generator 53 stop outputting the audio beep signal and the audio guard tone signal respectively. In the slave station of FIG. 6, the recovered audio speech signal disappears due to the interruption of the feed of the audio speech signal to the transmitter 55 at the base station of FIG. 5. Also, in the slave station of FIG. 6, the recovered audio beep signal and the recovered audio guard tone signal disappear due to stopping of the audio beep signal and the audio guard tone signal at the base station of FIG. 5. Accordingly, the corresponding beep and speech sounds disappear from the headset 67. The order taker is informed by the disappearance of the beep and speech sounds that the vehicle has moved away from the menu board. Thus, the order taker depresses the talk switch 70 again. When the talk switch 70 is depressed again, the talk control circuit 69 changes the transmitter 62 from the talk lock state to a stand-by state.

In the case where the order taker fails to depress the talk switch 70 again although the order taker is informed that the vehicle has moved away from the menu board, the transmitter 62 and the tone generator 68 remain active. Accordingly, in this case, the slave station of FIG. 6 continues to transmit the FM radio wave having information of the talk tone. The base station of FIG. 5 receives the FM radio wave from the slave station of FIG. 6. In the base station of FIG. 5, the receiver 56 recovers the audio talk tone signal from the received FM radio wave. The recovered audio talk tone signal is detected by the tone detector 49. In response to the detection of the audio talk tone signal, the tone detector 49 outputs an on signal to the tone generator 53. Since the vehicle has moved away from the menu board, the vehicle detector 46 outputs the off signal to the tone generator 53. The tone generator 53 outputs an audio tone signal for talk lock release when receiving the on signal from the tone detector 49 and receiving the off signal from the vehicle detector 46. At this time, the talk lock canceling switch 73 is generally in an off state. The audio tone signal for talk lock release is fed from the tone generator 53 to the transmitter 55 via the transmission mixer 54. The transmitter 55 subjects the first RF carrier to frequency modulation in response to the audio tone signal for talk lock release. The transmitter 55 feeds resultant FM radio wave to the antenna 58 via the antenna duplexer 57. The FM radio wave is radiated from the antenna 58 toward the slave station of FIG. 6.

The FM radio wave radiated from the antenna 58 of the base 5 station of FIG. 5 is received by the antenna 59 of the slave station of FIG. 6. The FM radio wave is fed from the antenna 59 to the receiver 61 via the antenna duplexer 60. The receiver 61 recovers the audio tone signal for talk lock release from the FM radio wave. The recovered audio tone signal for talk lock release is detected by the tone detector 64. In response to the detection of the audio tone signal for talk lock release, the tone detector 64 outputs a talk lock release signal to the talk control circuit 69. The talk control circuit 69 changes the transmitter 62 from the talk lock state to the standby state in response to the talk lock release signal.

As understood from the previous description, in the case where the order taker fails to depress the talk switch 70 again, although the order taker is informed that the vehicle has moved away from the menu board, the slave station of FIG. 6 is automatically changed from the talk lock state to the stand-by state. Thus, in this case, the slave station of FIG. 6 is prevented from interfering with communication between the base station of FIG. 5 and another slave station. Further, it is possible to implement page communication between the slave station of FIG. 6 and another station.

In the base station of FIG. 5, when the talk lock canceling switch 73 is changed from its off state to its on state, the tone generator 53 outputs the audio tone signal for talk lock release regardless of whether the tone generator 53 receives the on signal or the off signal from the vehicle detector 46. The slave station of FIG. 6 is changed from the talk lock state to the stand-by state in response to the audio tone signal for talk lock release.

In the slave station of FIG. 6, the order taker depresses the page switch 72 when requiring communication with a person in another slave station. In response to the depression of the page switch 72, the page control circuit 71 changes the transmitter 62 to a page lock state and activates the tone generator 68. The transmitter 62 remains in the page lock state until the page switch 72 is depressed again (next). Speech applied to the headset 67 from the order taker is converted thereby into a corresponding audio speech signal which is fed to the transmitter 62 via the microphone amplifier 66. The tone generator 68 outputs an audio page tone signal to the transmitter 62. The transmitter 62 subjects the second RF carrier to frequency modulation in response to the audio speech signal and the audio page tone signal. The transmitter 62 feeds resultant FM radio wave to the antenna 59 via the antenna duplexer 60. The FM radio wave is radiated from the antenna 59 toward the base station of FIG. 5. The FM radio wave radiated from the antenna 59 of the slave station of FIG. 6 is received by the antenna 58 of the base station of FIG. 5. The FM radio wave is fed from the antenna 58 to the receiver 56 via the antenna duplexer 57. The receiver 56 recovers the audio speech signal and the audio page tone signal from the FM radio wave. The recovered audio page tone signal is detected by the tone detector 49, and the analog switch 51 is turned on by the tone detector 49 in response to the detection of the audio page tone signal. The recovered audio speech signal is fed from the receiver 56 to the transmitter 55 via the analog switch 51 and the transmission mixer 54. The transmitter 55 subjects the first RF carrier to frequency modulation in response to the recovered audio speech signal. The transmitter 55 feeds resultant FM radio wave to the antenna 58 via the antenna duplexer 57. The FM radio wave is radiated from the antenna 58 toward another slave station. In this way, the order taker in the slave station of FIG. 6 can communicate with a person in another slave station while the base station of FIG. 5 serves as a repeater.

Second Embodiment

Figure 7:
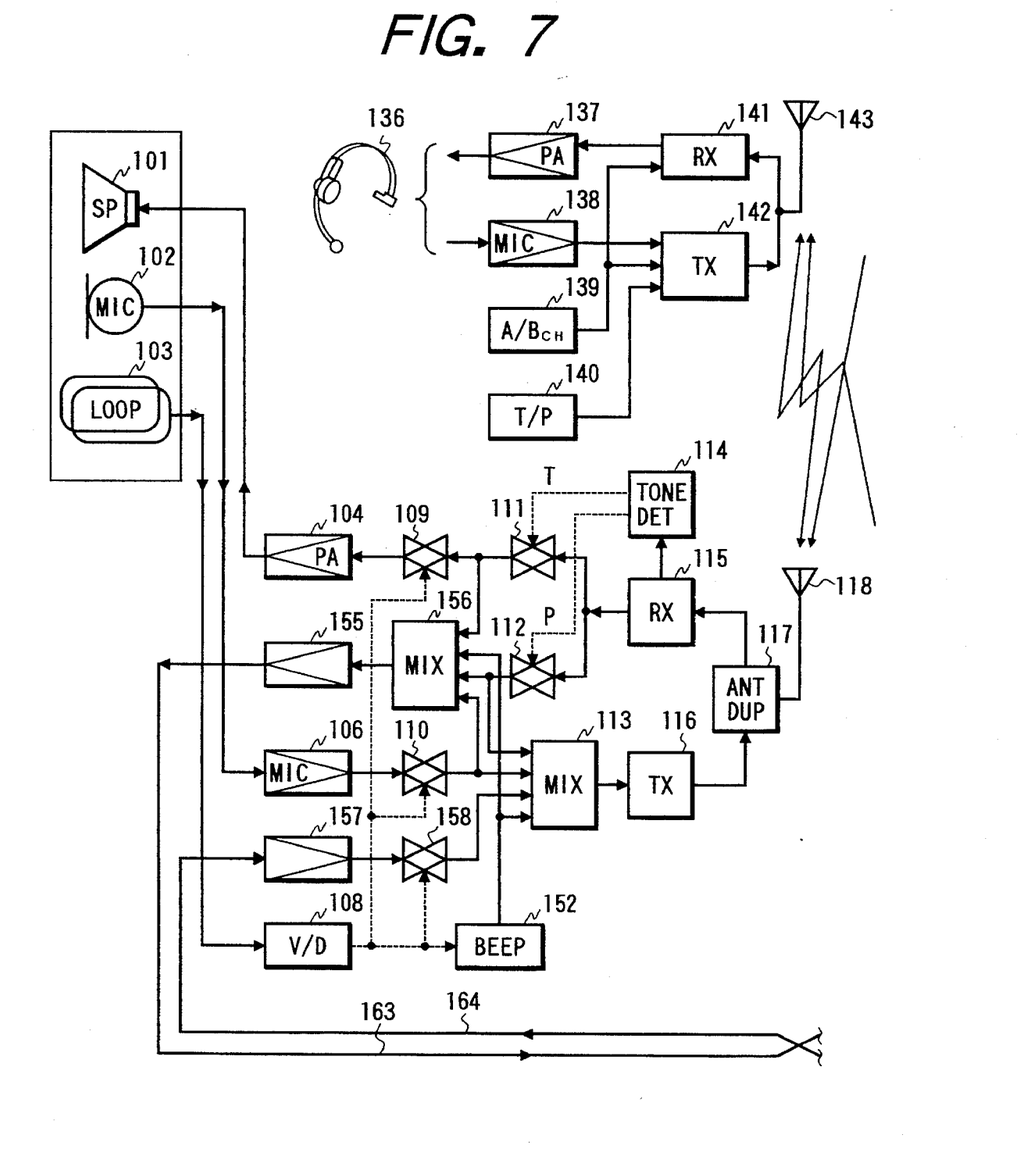
FIG. 7 is a block diagram of a base station and a slave station of a drive through lane "A" in a wireless order taking system of a double drive through type according to a second embodiment of this invention.
Figure 8:
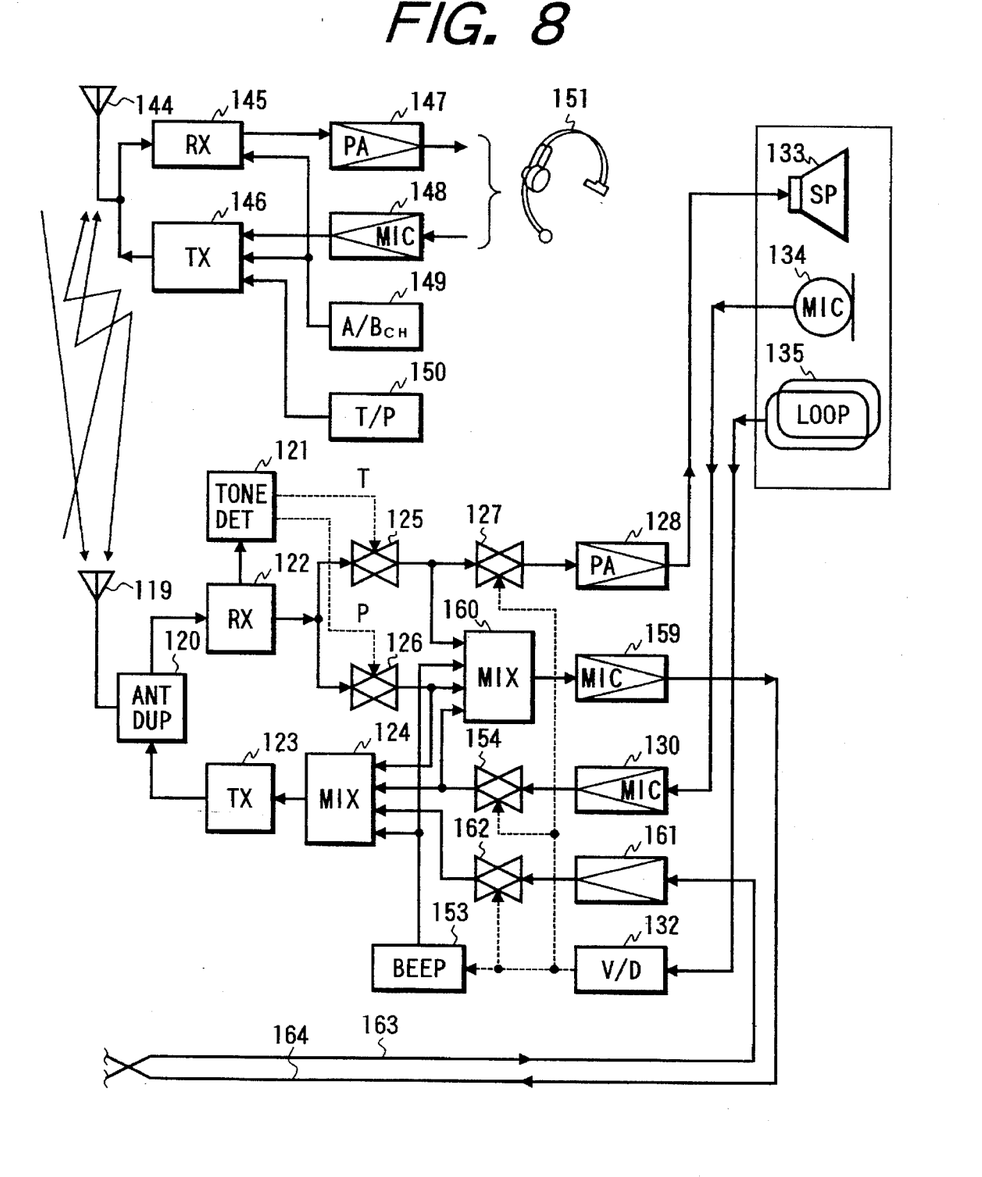
FIG. 8 is a block diagram of a base station and a slave station of a drive through lane "B" in the wireless order taking system according to the second embodiment of this invention.

FIG. 7 and FIG. 8 show base stations and slave stations in a wireless order taking system of a double drive through type according to a second embodiment of this invention. FIG. 7 illustrates a base station and a slave station of a drive through lane "A". FIG. 8 illustrates a base station and a slave station of a drive through lane "B".

With reference to FIG. 7, the base station of the drive through lane "A" has a menu board on which a loudspeaker 101, a microphone 102, and a vehicle sensing loop coil 103 are provided. The menu board faces the drive through lane "A". The loudspeaker 101 is connected to a power amplifier 104 which is successively preceded by analog switches 109 and 111 and a receiver (a radio receiver) 115. The microphone 102 is connected to a microphone amplifier 106 which is successively followed by an analog switch 110, a transmission mixer 113, and a transmitter (a radio transmitter) 116. The loop coil 103 is connected to a vehicle detector 108 which is successively followed by a beep generator 152, the transmission mixer 113, and the transmitter 116.

In the base station of FIG. 7, a tone detector 114 is connected to the receiver 115, the analog switch 111, and an analog switch 112. The analog switch 112 is also connected to the receiver 115 and the transmission mixer 113. An antenna duplexer 117 is connected to an antenna 118, the receiver 115, and the transmitter 116. The analog switches 109 and 110 are connected to the vehicle detector 108.

In the base station of FIG. 7, a buffer amplifier 155 for voice transmission to the drive through lane "B" is connected to a voice link cable 163 extending to the drive through lane "B". The buffer amplifier 155 is also connected to the output side of a voice link mixer 156. The input side of the voice link mixer 156 is connected to the analog switches 110, 111, and 112, and the beep generator 152. A buffer amplifier 157 for voice reception from the drive through lane "B" is connected to a voice link cable 164 extending from the drive through lane "B". The buffer amplifier 157 is successively followed by an analog switch 158 and the transmission mixer 113. The analog switch 158 is connected to the vehicle detector 108. The analog switch 158 serves as a voice muting device. The analog switch 158 falls into an off state in response to an on signal (a detection signal) outputted from the vehicle detector 108.

With reference to FIG. 7, the slave station of the drive through lane "A" includes a headset 136 attached to an order taker (a slave station operator). The headset 136 has a headphone and a microphone. The headset 136 is connected to a power amplifier 137 and a microphone amplifier 138. The power amplifier 137 is preceded by a receiver (a radio receiver) 141. The microphone amplifier 138 is followed by a transmitter (a radio transmitter) 142. The receiver 141 and the transmitter 142 are connected to an antenna 143. An A/B lane change switch 139 is connected to the receiver 141 and the transmitter 142. A talk/page change switch 140 is connected to the transmitter 142. Here, "talk" means communication between the order taker and a customer in a vehicle while "page" means communication between the order taker and another order taker.

With reference to FIG. 8, the base station of the drive through lane "B" has a menu board on which a loudspeaker 133, a microphone 134, and a vehicle sensing loop coil 135 are provided. The menu board faces the drive through lane "B". The loudspeaker 133 is connected to a power amplifier 128 which is successively preceded by analog switches 127 and 125 and a receiver (a radio receiver) 122. The microphone 134 is connected to a microphone amplifier 130 which is successively followed by an analog switch 154, a transmission mixer 124, and a transmitter (a radio transmitter) 123. The loop coil 135 is connected to a vehicle detector 132 which is successively followed by a beep generator 153, the transmission mixer 124, and the transmitter 123.

In the base station of FIG. 8, a tone detector 121 is connected to the receiver 122, the analog switch 125, and an analog switch 126. The analog switch 126 is also connected to the receiver 122 and the transmission mixer 124. An antenna duplexer 120 is connected to an antenna 119, the receiver 122, and the transmitter 123. The analog switches 127 and 154 are connected to the vehicle detector 132.

In the base station of FIG. 8, a buffer amplifier 159 for voice transmission to the drive through lane "A" is connected to the voice link cable 164 extending to the drive through lane "A". The buffer amplifier 159 is also connected to the output side of a voice link mixer 160. The input side of the voice link mixer 160 is connected to the analog switches 125, 126, and 154, and the beep generator 153. A buffer amplifier 161 for voice reception from the drive through lane "A" is connected to the voice link cable 163 extending from the drive through lane "A". The buffer amplifier 161 is successively followed by an analog switch 162 and the transmission mixer 124. The analog switch 162 is connected to the vehicle detector 132. The analog switch 162 serves as a voice muting device. The analog switch 162 falls into an off state in response to an on signal (a detection signal) outputted from the vehicle detector 132.

With reference to FIG. 8, the slave station of the drive through lane "B" includes a headset 151 attached to an order taker (a slave station operator). The headset 151 has a headphone and a microphone. The headset 151 is connected to a power amplifier 147 and a microphone amplifier 148. The power amplifier 147 is preceded by a receiver (a radio receiver) 145. The microphone amplifier 148 is followed by a transmitter (a radio transmitter) 146. The receiver 145 and the transmitter 146 are connected to an antenna 144. An A/B lane change switch 149 is connected to the receiver 145 and the transmitter 146. A talk/page change switch 150 is connected to the transmitter 146.

The wireless order taking system of FIGS. 7 and 8 operates as follows. Under normal conditions, the A/B lane change switch 139 in the A-lane slave station of FIG. 7 is in a position corresponding to the drive through lane "A" while the A/B lane change switch 149 in the B-lane slave station of FIG. 8 is in a position corresponding to the drive through lane "B". When a vehicle comes along the drive through lane "A" to a given place in front of the menu board, the vehicle detector 108 in the A-lane base station of FIG. 7 detects the vehicle in the given place via the loop coil 103. Accordingly, the vehicle detector 108 outputs a corresponding detection signal to the analog switches 109 and 110, turning on the analog switches 109 and 110. The vehicle detector 108 outputs the detection signal also to the beep generator 152, activating the beep generator 152. Speech applied to the menu board microphone 102 from a customer in the vehicle is converted thereby into a corresponding audio speech signal which is fed to the transmission mixer 113 via the microphone amplifier 106 and the analog switch 110. The beep generator 152 outputs an audio beep signal representative of the vehicle detection to the transmission mixer 113. The audio speech signal and the audio beep signal are combined by the transmission mixer 113 into a composite audio signal. The composite audio signal is fed from the transmission mixer 113 to the transmitter 116. The transmitter 116 subjects a first RF carrier to frequency modulation in response to the composite audio signal. The transmitter 116 feeds resultant FM radio wave to the antenna 118 via the antenna duplexer 117. The FM radio wave is radiated from the antenna 118 toward the A-lane slave station of FIG. 7. In addition, the audio speech signal is fed from the menu board microphone 102 to the voice link mixer 156 via the microphone amplifier 106 and the analog switch 110. The audio beep signal is fed from the beep generator 152 to the voice link mixer 156. The audio speech signal and the audio beep signal are applied to the buffer amplifier 155 via the voice link mixer 156. Then, the audio speech signal and the audio beep signal are transmitted from the buffer amplifier 155 in the A-lane base station of FIG. 7 to the buffer amplifier 161 in the B-lane base station of FIG. 8 via the voice link cable 163.

The FM radio wave radiated from the antenna 118 of the A-lane base station of FIG. 7 is received by the antenna 143 of the A-lane slave station of FIG. 7. The FM radio wave is fed from the antenna 143 to the receiver 141. The A/B lane change switch 139 is previously set to the A-lane position so that the receiver 141 and the transmitter 142 operate in modes for the drive through lane "A". The receiver 141 recovers the audio speech signal and the audio beep signal from the FM radio wave. The recovered audio beep signal and the recovered audio speech signal are fed from the receiver 141 to the headset 136 via the power amplifier 137 before being converted by the headset 136 into corresponding beep and speech sounds. The beep and speech sounds inform the order taker that the vehicle has come to the given place in the drive through lane "A". Then, the order taker changes the talk/page change switch 140 to a talk position. The operation mode of the transmitter 142 is changed to a talk mode in response to the change of the talk/page change switch 140 to the talk position. Speech applied to the headset 136 from the order taker is converted thereby into a corresponding audio speech signal which is fed to the transmitter 142 via the microphone amplifier 138. The transmitter 142 subjects a second RF carrier to frequency modulation in response to the audio speech signal. The transmitter 142 superimposes an audio talk tone signal on the audio speech signal when operating in the talk mode. The transmitter 142 feeds resultant FM radio wave to the antenna 143. The FM radio wave is radiated from the antenna 143 toward the A-lane base station of FIG. 7.

The FM radio wave radiated from the antenna 143 of the A-lane slave station of FIG. 7 is received by the antenna 118 of the A-lane base station of FIG. 7. The FM radio wave is fed from the antenna 118 to the receiver 115 via the antenna duplexer 117. The receiver 115 recovers the audio speech signal and the audio talk tone signal from the FM radio wave. The recovered audio talk tone signal is detected by the tone detector 114, and the analog switch 111 is turned on by the tone detector 114 in response to the detection of the audio talk tone signal. The recovered audio speech signal is fed from the receiver 115 to the menu board loudspeaker 101 via the analog switches 111 and 109 and the power amplifier 104 before being converted by the menu board loudspeaker 101 into corresponding speech sounds. Accordingly, the customer in the vehicle in front of the A-lane menu board and the order taker in the drive through lane "A" can communicate with each other by wireless (radio).

In the B-lane base station of FIG. 8, the vehicle detector 132 closes the analog switch 162 when a vehicle is absent from a given place in front of the B-lane menu board. Therefore, in this case, the audio speech signal and the audio beep signal, which are transmitted from the A-lane base station of FIG. 7 via the voice link cable 163, travels through the buffer amplifier 161, the analog switch 162, and the transmission mixer 124 before reaching the transmitter 123. The transmitter 123 subjects a third RF carrier to frequency modulation in response to the audio speech signal and the audio beep signal. The transmitter 123 feeds resultant FM radio wave to the antenna 119 via the antenna duplexer 120. The FM radio wave is radiated from the antenna 119 toward the B-lane slave station of FIG. 8. The FM radio wave radiated from the antenna 119 of the B-lane base station of FIG. 8 is received by the antenna 144 of the B-lane slave station of FIG. 8. The FM radio wave is fed from the antenna 144 to the receiver 145. The A/B lane change switch 149 is previously set to the B-lane position so that the receiver 145 and the transmitter 146 operate in modes for the drive through lane "B". The receiver 145 recovers the audio speech signal and the audio beep signal from the FM radio wave. The recovered audio beep signal and the recovered audio speech signal are fed from the receiver 145 to the headset 151 via the power amplifier 147 before being converted by the headset 151 into corresponding beep and speech sounds. The beep and speech sounds inform the B-lane order taker that the vehicle has come to the given place in the drive through lane "A". In this way, both the A-lane order taker and the B-lane order taker are informed that the vehicle has come to the given place in the drive through lane "A".

During the previously-mentioned wireless communication between the A-lane base station of FIG. 7 and the A-lane slave station of FIG. 7, the recovered audio speech signal in the A-lane base station is fed from the receiver 115 to the voice link mixer 156 via the analog switch 111. The audio speech signal travels from the voice link mixer 156 to the buffer amplifier 155. Then, the audio speech signal is transmitted from the buffer amplifier 155 in the A-lane base station of FIG. 7 to the buffer amplifier 161 in the B-lane base station of FIG. 8 via the voice link cable 163. In the B-lane base station of FIG. 8, the audio speech signal, which is transmitted from the A-lane base station of FIG. 7 via the voice link cable 163, travels through the buffer amplifier 161, the analog switch 162, and the transmission mixer 124 before reaching the transmitter 123. The transmitter 123 subjects the third RF carrier to frequency modulation in response to the audio speech signal. The transmitter 123 feeds resultant FM radio wave to the antenna 119 via the antenna duplexer 120. The FM radio wave is radiated from the antenna 119 toward the B-lane slave station of FIG. 8. The FM radio wave radiated from the antenna 119 of the B-lane base station of FIG. 8 is received by the antenna 144 of the B-lane slave station of FIG. 8. The FM radio wave is fed from the antenna 144 to the receiver 145. The A/B lane change switch 149 is previously set to the B-lane position so that the receiver 145 and the transmitter 146 operate in modes for the drive through lane "B". The receiver 145 recovers the audio speech signal from the FM radio wave. The recovered audio speech signal is fed from the receiver 145 to the headset 151 via the power amplifier 147 before being converted by the headset 151 into corresponding speech sounds. In this way, the B-lane order taker can monitor the previously-mentioned wireless communication between the A-lane base station of FIG. 7 and the A-lane slave station of FIG. 7.

In the case where vehicles are absent from the given places in the drive through lane "A" and the drive through lane "B", the A-lane order taker sets the talk/page change switch 140 in the A-lane slave station to a page position when requiring page communication with the B-lane order taker. The operation mode of the transmitter 142 is changed to a page mode in response to the setting of the talk/page change switch 140 to the page position. Speech applied to the headset 136 from the A-lane order taker is converted thereby into a corresponding audio speech signal which is fed to the transmitter 142 via the microphone amplifier 138. The transmitter 142 subjects the second RF carrier to frequency modulation in response to the audio speech signal. The transmitter 142 superimposes an audio page tone signal on the audio speech signal when operating in the page mode. The transmitter 142 feeds resultant FM radio wave to the antenna 143. The FM radio wave is radiated from the antenna 143 toward the A-lane base station of FIG.

The FM radio wave radiated from the antenna 143 of the A-lane slave station of FIG. 7 is received by the antenna 118 of the A-lane base station of FIG. 7. The FM radio wave is fed from the antenna 118 to the receiver 115 via the antenna duplexer 117. The receiver 115 recovers the audio speech signal and the audio page tone signal from the FM radio wave. The recovered audio page tone signal is detected by the tone detector 114, and the analog switch 112 is turned on by the tone detector 114 in response to the detection of the audio page tone signal. The recovered audio speech signal is fed from the receiver 115 to the voice link mixer 156 via the analog switch 112. The audio speech signal travels from the voice link mixer 156 to the buffer amplifier 155. Then, the audio speech signal is transmitted from the buffer amplifier 155 in the A-lane base station of FIG. 7 to the buffer amplifier 161 in the B-lane base station of FIG. 8 via the voice link cable 163. In the B-lane base station of FIG. 8, the audio speech signal, which is transmitted from the A-lane base station of FIG. 7 via the voice link cable 163, travels through the buffer amplifier 161, the analog switch 162, and the transmission mixer 124 before reaching the transmitter 123. The transmitter 123 subjects the third RF carrier to frequency modulation in response to the audio speech signal. The transmitter 123 feeds resultant FM radio wave to the antenna 119 via the antenna duplexer 120. The FM radio wave is radiated from the antenna 119 toward the B-lane slave station of FIG. 8. The FM radio wave radiated from the antenna 119 of the B-lane base station of FIG. 8 is received by the antenna 144 of the B-lane slave station of FIG. 8. The FM radio wave is fed from the antenna 144 to the receiver 145. The A/B lane change switch 149 is previously set to the B-lane position so that the receiver 145 and the transmitter 146 operate in modes for the drive through lane "B". The receiver 145 recovers the audio speech signal from the FM radio wave. The recovered audio speech signal is fed from the receiver 145 to the headset 151 via the power amplifier 147 before being converted by the headset 151 into corresponding speech sounds. In this way, the B-lane order taker receives the speech sounds uttered by the A-lane order taker.

Operation of the B-lane base station of FIG. 8 and the B-lane slave station of FIG. 8 is similar to the previously-mentioned operation of the A-lane base station of FIG. 7 and the A-lane slave station of FIG. 7, Since the A-lane base station of FIG. 7 and the B-lane base station of FIG. 8 are connected by the voice link cables 163 and 164, the B-lane slave station of FIG. 8 can execute page communication with the A-lane slave station of FIG. 7 as the A-lane slave station of FIG. 7 executes page communication with the B-lane slave station of FIG. 8.

As previously described, the A-lane base station of FIG. 7 and the B-lane base station of FIG. 8 can communicate with each other via the voice link cables 163 and 164. When the vehicle detector 108 in the A-lane base station of FIG. 7 outputs the detection signal to the analog switch 158, that is, when a vehicle comes to the given place in the drive through lane "A", the analog switch 158 assumes the off state so that audio signals transmitted from the B-lane base station of FIG. 8 are muted. Accordingly, in this case, the audio signals transmitted from the B-lane base station of FIG. 8 are prevented from interfering with order taking communication between the A-lane base station of FIG. 7 and the A-lane slave station of FIG. 7. When the vehicle detector 132 in the B-lane base station of FIG. 8 outputs the detection signal to the analog switch 162, that is, when a vehicle comes to the given place in the drive through lane "B", the analog switch 162 assumes the off state so that audio signals transmitted from the A-lane base station of FIG. 7 are muted. Accordingly, in this case, the audio signals transmitted from the A-lane base station of FIG. 7 are prevented from interfering with order taking communication between the B-lane base station of FIG. 8 and the B-lane slave station of FIG. 8.

As previously described, both the A-lane order taker and the B-lane order taker can be informed that a vehicle has come to the given place in the drive through lane "A". Similarly, both the A-lane order taker and the B-lame order taker can be informed that a vehicle has come to the given place in the drive through lane "B". Therefore, only one of the A-lane order taker and the B-lane order taker suffices to know that a vehicle comes to the given place in each of the drive through lanes "A" and "B".

What is claimed is:

1. A drive through wireless order taking system comprising:

a base station; and a slave station being connectable with the base station by radio and being manually movable into and out of a talk lock state at the discretion of an order taker;

wherein the base station comprises means for transmitting a talk lock release signal to the slave station, and the slave station comprises means for automatically moving the slave station out of the talk lock state in response to the talk lock release signal transmitted from the base station.

2. The drive through wireless order taking system of claim 1, wherein the base station includes means for detecting that a vehicle moves from a given place in a drive through lane, and said transmitting means comprises means for transmitting the talk lock release signal when said detecting means detects that a vehicle moves from the given place in the drive through lane whereby the slave station is automatically placed out of the talk state.

3. The drive through wireless order taking system of claim 1, further comprising a talk lock release switch, wherein said transmitting means comprises means for transmitting the talk lock release signal when the talk lock release switch is actuated.

4. A wireless order taking system for first and second drive through lanes, comprising:

a first base station in the first drive through lane;

a first slave station in the first drive through lane, the first slave station being connectable with the first base station by radio;

a second base station in the second drive through lane;

a second slave station in the second drive through lane, the second slave station being connectable with the second base station by radio;

a wire connected between the first base station and the second base station;

first means in the first base station for transmitting a first page communication signal to the second base station via the wire;

second means in the second base station for transmitting a second page communication signal to the first base station via the wire;

third means in the first base station for receiving the second page communication signal from the second base station, and transmitting the second page communication signal to the first slave station by radio;

fourth means in the second base station for receiving the first page communication signal from the first base station, and transmitting the first page communication signal to the second slave station by radio;

fifth means in the first base station for detecting that a vehicle comes to a given place in the first drive through lane;

sixth means in the first base station for muting the second page communication signal when the fifth means detects that a vehicle comes to the given place in the first drive through lane;

seventh means in the second base station for detecting that a vehicle comes to a given place in the second drive through lane; and eighth means in the second base station for muting the first page communication signal when the seventh means detects that a vehicle comes to the given place in the second drive through lane.

5. The wireless order taking system of claim 4, wherein the first means comprises means for adding a signal of customer speech and a signal of a beep tone to the first page communication signal when the fifth means detects that a vehicle comes to the given place in the first drive through lane, and the second means comprises means for adding a signal of customer speech and a signal of a beep tone to the second page communication signal when the seventh means detects that a vehicle comes to the given place in the second drive through lane.

* * * * *